(12) United States Patent
Oakes et al.

(10) Patent No.: US 7,600,049 B2
(45) Date of Patent: Oct. 6, 2009

(54) METHOD, SYSTEM, AND COMPUTER PROGRAM PRODUCT FOR TIMING OPERATIONS OF DIFFERENT DURATIONS IN A MULTI-PROCESSOR, MULTI-CONTROL BLOCK ENVIRONMENT

(75) Inventors: Kenneth J. Oakes, Wappingers Falls, NY (US); John S. Trotter, Pleasant Valley, NY (US)

(73) Assignee: International Business Machines Corporation, Armonk, NY (US)

(*) Notice: Subject to any disclaimer, the term of this patent is extended or adjusted under 35 U.S.C. 154(b) by 246 days.

(21) Appl. No.: 11/531,748

(22) Filed: Sep. 14, 2006

(65) Prior Publication Data

US 2008/0126639 A1    May 29, 2008

(51) Int. Cl.
    *G06F 3/00*    (2006.01)
(52) U.S. Cl. .............................. 710/5; 710/39; 710/40; 710/58
(58) Field of Classification Search ............... 710/5, 710/39, 40, 58
See application file for complete search history.

(56) References Cited

U.S. PATENT DOCUMENTS

| | | | | |
|---|---|---|---|---|
| 5,491,799 | A * | 2/1996 | Kreuzenztein et al. | 709/213 |
| 6,985,455 | B1 * | 1/2006 | Heath et al. | 370/316 |
| 7,143,131 | B1 * | 11/2006 | Soles et al. | 709/203 |
| 2004/0117791 | A1 * | 6/2004 | Prasad et al. | 718/100 |
| 2004/0230979 | A1 * | 11/2004 | Beecroft et al. | 718/100 |

FOREIGN PATENT DOCUMENTS

CN        1570785 A    1/2005

* cited by examiner

*Primary Examiner*—Niketa I Patel
(74) *Attorney, Agent, or Firm*—Cantor Colburn LLP; Arthur Ortega

(57) ABSTRACT

Operations in a multi-processor, multi-control block environment are timed using timing queues and instruction queues. Upon receipt of a request for a subchannel control block (SCB) to perform an operation that needs to be timed, the SCB is queued on one of multiple timing queues based on an elapsed timeout limit (ETL) of the operation. There is an ETL for each operation, and each one the multiple timing queues is associated with an ETL for completing an operation. The SCB may be placed at the bottom of the timing queue, the timing queue ordered from oldest to youngest which allows for quickly checking large numbers of SCBs without having to check every element queue and without having to dequeuing the elements from this queue. Upon receipt of a request to perform a high-priority operation, the SCB may be queued in a high priority instruction queue. The SCB may remain the timing queue to retain its order and be placed on a high priority instruction queue for retrying an operation. Upon completion of the operation or occurrence of a timeout, the SCB is dequeued. The SCB may be requeued if it was dequeued upon occurrence of a timeout. One or more timing queues may be checked for SCB operation timeouts by one or more SAPs in a round robin fashion.

21 Claims, 12 Drawing Sheets

METHOD, SYSTEM, AND COMPUTER PROGRAM PRODUCT FOR TIMING OPERATIONS OF DIFFERENT DURATIONS IN A MULTI-PROCESSOR, MULTI-CONTROL BLOCK ENVIRONMENT

BACKGROUND

The present disclosure relates generally to operation timing, and, in particular, to timing operations of different durations.

Mainframe computer systems, such as IBM's zSeries computing systems have evolved into extremely useful systems, in large part because of their adaptability to changing needs of enterprises. A zSeries system typically includes a mainframe, including Subchannel Control Blocks (SCBs), a Channel Subsystem (CSS), an I/O configuration, central processors, and a main storage. The CSS performs various functions/operations, including a Start Subchannel (SSCH) operation used to initiate the movement of data to and from main storage. CSS also performs a Halt SubChannel (HSCH) operation and a Clear Subchannel (CSCH) operation used mainly to reset devices and subchannel control blocks (SCBs) when I/O activity initiated by an SSCH instruction needs to be terminated, or the device needs a reset.

It has become important to time certain I/O operations within the CSS, including those related to SCB I/O operations. Two such I/O operations that are timed by the CSS are the HSCH operation and the CSCH operation. These operations are described from a functional viewpoint in the z/Architecture Principle of Operation (POP), IBM Corporation, September 2005, 5$^{th}$ Edition, SA22-7832-04, incorporated herein by reference.

Current timing methods have been useful for timing operations. However, with the introduction of systems with more sophisticated features, such as the Multiple Channel Subsystem (MCSS) feature on the z990 mainframe, the number of subchannels increases significantly for both the system as a whole and on a per channel basis. This increase in the number of subchannels and SCBs has made current timing mechanisms less useful.

To better understand the problems associated with the existing timing methods, consider how a CSCH operation is initiated and currently timed from a zSeries systems internal viewpoint. A conventional process for timing these instructions includes using existing SCBs in firmware accessible memory otherwise known as the hardware system area (HSA) 1002 and System Assist Processors (SAP) within the CSS 1000. If a software program running on a CP 1001 initiates a CSCH instruction, the CP firmware executing the CSCH instruction first sets the CSCH instruction into a SCB 1003 and then proceeds to queue that SCB on the bottom of a Work Queue (WQ) 1004. In the example shown in FIG. 1, the SCB is queued on the bottom of WQ z. The CP firmware then signals the SAP z, which is the "owner" of WQ z, with a "Halt/Clear signal" via control circuitry 1010. This signal indicates that one or more SCBs with these functions to process have been queued on the WQ z owned by SAP z. SAP z then searches WQ z, starting from the top of the queue, looking for a HSCH or CSCH instruction to process. Other SCBs with other types of I/O operations to process, such as Start Subchannel (SSCH), are skipped over. Once an SCB with HSCH or CSCH instruction is found, the SAP z removes that SCB from WQ z. In this example, the SCB 1003 with the CSCH is dequeued. If this is the first time the SCB 1003 has been dequeued from a WQ within the context of this CSCH, SAP z 1005 stores a Time Stamp (T/S) 1006 into the SCB.

The time stamp may be derived from a current stamp as shown in detail FIG. 2. Details of steps included in a conventional timing process as described above and in the remainder of this Background portion are shown in FIG. 3.

Referring back to FIG. 1, SAP z then begins processing the CSCH instruction. If a Clear Signal needs to be sent to a device in the I/O configuration 1007 that is associated with the SCB being processed for the CSCH, SAP z performs an I/O path selection to determine the channel path identified by a channel path identifier (CHPID) number within the CSS 1000 that would drive the Clear Signal to the desired device via a channel connection 1009. If, for example, either CHPID 02 or CHPID y was selected, SAP z could proceed to signal the selected CHPID to perform the CSCH. This is because those CHPIDs have affinity to SAP z as indicated by the hash lines 1008. For further description of "Channel to SAP (or IOP)" affinity, the reader is described to U.S. Pat. No. 6,973, 529. If CHPID 01 needs to be selected, the SCB with the CSCH function would need to be queued on the bottom of WQ 0 since CHPID 01 has affinity to SAP 0 in this example. Then SAP z would have to signal SAP 0 with a "Halt/Clear signal". Once this SCB bubbled to the top of WQ 0, SAP 0 would then perform the same steps as was previously done by SAP z with the exception of inserting a T/S in the subchannel since the timing would already have been started. Hence, this re-queue on the WQ further elongates the elapsed time (ET) it takes to complete the CSCH operation.

If the SCB is on WQ 0, and SAP 0 dequeues it, SAP 0 instead computes the ET for this CSCH and compares it to the elapsed time limit (ETL) for a CSCH rather than storing a new function T/S in the SCB. Once the path is selected, the CHPID is signaled by SAP 0 via circuitry within the CSS to perform the CSCH operation. If the CHPID is busy and cannot accept the signal to perform the CSCH operation, SAP 0 puts the SCB back on WQ 0, and the process described in this paragraph is repeated. If this busy condition does not clear up after repeated attempts, the ET eventually exceeds the ETL, and recovery is invoked as shown in detail in FIG. 3.

If CHPID 01 is able to process the CSCH operation, SAP 0 still puts the SCB back on WQ 0 after signaling CHPID 01 to perform the CSCH, but with the Clear Issued State set within the SCB. At this point, the SCB is on the WQ merely to time the completion of the CSCH. When CHPID 01 completes the CSCH, which may involve sending a Clear Signal in the desired device, CHPID 01 signals SAP 0 that it has completed the CSCH. SAP 0 then dequeues the SCB from WQ 0 and reports the results of the CSCH operation back to a CP that, in turn, signals the software program that issued it. If some problem occurs that prevents the CHPID from signaling SAP 0 of completion of the CSCH operation, the ET eventually exceeds the ETL, and recovery is invoked for that CHPID as indicated in FIG. 3. Recovery results in a reset of that CHPID, which not only causes the CSCH to complete, but other operations on that channel also get reset, possibly resulting in one or more channel control check (CCC) operations.

CCC processing is a form of SCB recovery that is performed as the result of an error within the CSS that is encountered while the CSS is working with a particular subchannel. The high level description of CCC processing is also described in the above-referenced POP document. As in the case with the CSCH operation, SCBs with the CCC operation to perform are queued on a WQ. Also, as part of CCC processing, the channel is usually given the initiative to issue a Clear Signal to the device associated with the SCB. One difference between CSCH and CCC processing is that instead of an OS running on a CP initiating the CCC instruction as is done for a CSCH instruction, the CSS initiates the CCC processing. Nevertheless, the WQs are used to keep initiative to perform the CCC operation as well as time the completion of the operation. Also, requeuing the SCB on the WQ can occur for the same reasons as for the HSCH and CSCH operations (e.g., affinity, busy paths, and timing).

Another difference between CCC processing and CSCH processing is the ETL that is chosen. The recovery from the kinds of errors resulting in CCC usually involves resetting the entire channel that was working with the SCB at the time of the error prior to the actual processing of the CCC. Since the time to process a CCC on a reset channel is typically less than the time it takes to process a CSCH on a loaded channel, the ETL chosen for CCC processing to complete is typically set lower than the ETL for CSCH processing. So, for example, the ETL for CSCH processing is typically set at 14 seconds (as is the ETL for HSCH processing), while the ETL for CCC processing is typically set for 7 seconds. Thus, the code that does the timing needs to have logic to differentiate various ETLs depending on function.

FIG. 4 illustrates states of work queues and timing of subchannel control blocks in a conventional timing process. In FIG. 4, a WQ with a doubly linked list (DLL) with Top/Bottom pointers in the WQ header 4010 and Next/Previous pointers in the SCBs indicated by the arrows at 4020 are linked. Each SCB is shown to have either a SSCH, HSCH, CSCH or CCC operation to perform. Note that each SCB ET that is shown depicts the ET that would be computed using the algorithm in FIG. 3 which, in turn, uses the illustrated Current T/S 4000 and an arbitrary FUNC T/S in each SCB.

In this example, SCB 1 4001 is in the HSCH Not Issued state, which means the SAP has not yet signaled a CHPID to perform the HSCH. SCB 1 was put on WQ 0 for the first time for this HSCH, and it is shown to have no FUNC T/S value set at 4001. The FUNC T/S will be set into the SCB when the SAP dequeues the SCB off the WQ the first time for this HSCH.

SCB 2 4002 is in the HSCH Issued state, which means the HSCH was issued to a channel. The SAP re-queued the SCB back on the WQ after it issued the HSCH to a channel only as a means to give initiative to the SAP to time the HSCH operation. Completion occurs when the channel responds back to the SAP that the HSCH operation is completed, at which time the SAP will remove the SCB from the WQ. In the meantime, each time this SCB "bubbles" up to the top of the queue, the SAP dequeues it and computes the ET to determine if there is a timeout as illustrated in FIG. 3. If there is no timeout, the SCB is re-queued on the bottom of this WQ. This SCB would likely have been dequeued to check for a time out and re-queued multiple times, resulting in an ET of approximately 4-7 seconds.

SCB 3 4003 is in the CSCH Not Issued state. With a FUNC T/S set, the CSCH operation likely had been attempted to be issued to a channel. In this case, WQ 0 is being used to provide initiative for the SAP to keep attempting to issue the CSCH operation to a channel. Most likely, the selected channel was busy and the SCB had to be re-queued on the WQ to try later. The ET of 0.5 seconds at 4003 reflects that the SCB 3 had not been re-queued as many times as the SCB 2.

SCB 4 4004 is in a CSCH Issued state, which means the CSCH was issued to a channel. Like the HSCH Issued state for SCB 2, the SCB would be on the WQ as a means to time for completion of the CSCH operation. However, in this case, the ET of 14.2 seconds at 4005 has exceeded the ETL timeout value. It is likely that this SCB was re-queued on the WQ many more times than SCB 2 and SCB 3 were re-queued. Since the ET is over the 14 second ETL for this operation, when this SCB is dequeued, the SAP would then take the appropriate actions to recover both SCB 4 and the channel, which in turn would cause the CSCH operation to complete.

SCB 5 is in a CCC Issued state. Like the HSCH Issued and CSCH Issued states, the SCB 5 would be on the WQ as a means to time the CCC. However, for CCC functions, the ETL timeout is different than for the HSCH or CSCH functions, i.e., 7 seconds versus 14 seconds.

SCB 6 is in a SSCH Not Issued state. SSCH Instructions are not timed by the CSS. Thus, unlike HSCH, CSCH and CCC functions, once the SSCH is issued to the channel, the SCB is not put back on the WQ to be timed. Hence, there is less overhead per operation in terms of WQ utilization with regard to SSCHs once the SSCH is issued.

The speed at which a SSCH completes is an important benchmark measurement of a zSeries mainframe. Thus, it is important that any potential performance bottlenecks that slow down SSCH processing are minimized. Most of the time, the majority of the SCBs on the WQs typically have SSCH functions to process. However, at times, HSCH and CSCH instructions are used by the OS in recovery situations, and CCC processing is initiated by the CSS during CSS recovery operations.

As an example of a situation whereby the OS issues an unusually large number of HSCH instructions (and, possibly, CSCH instructions) is when a link failure outboard in the fabric is detected by a FICON channel and reported to the OS. When a link failure occurs, the OS performs device recovery for every device associated with that link. This may involve a large number of devices and a large number of subchannel control blocks, each of which would need to be issued a HSCH instruction and possibly a CSCH instruction. Even with a flurry of HSCH instructions to process, in the past there was no noticeable effect to SSCH performance on early mainframes.

However, with the introduction of more sophisticated mainframes with a significant increase in the number of subchannels and SCBs, the WQ performance may be impacted if it is used as a means to keep initiative for timing and processing functions, such as HSCH, CSCH and CCC operations. Adding to the WQ congestion is the need to re-queue the same SCB on the WQ multiple times for timing and/or to maintain initiative for the functions as discussed above. Also, the method of giving high priority to HSCH and CSCH by having the SAP search for SCBs on WQs with HSCH or CSCH functions pending further delays the processing SSCHs.

Accordingly, there is a need for a new operation timing technique that reduces WQ bottlenecks.

SUMMARY

According to exemplary embodiments, a method, computer program product, and system are provided for timing operations in a multi-processor, multi-control block environment using timing queues and instruction queues. Upon receipt of a request for a subchannel control block (SCB) to perform an operation that needs to be timed, the SCB is queued on one of multiple timing queues based on an elapsed timeout limit (ETL) of the operation. There is an ETL for each operation, and each one the multiple timing queues is associated with an ETL for completing an operation. The SCB may be placed at the bottom of the timing queue, the timing queue ordered from oldest to youngest. This ordering allows for quickly checking large numbers of SCB being timed. Timeout checking may be done without dequeuing SCBs from a timing queue and if the top of a timing queue (oldest) SCB operation has not timed out, none of the other elements on that timing queue need to be checked for a timeout. Upon receipt of a request to perform a high-priority operation, the SCB may be queued in a high priority instruction queue by a CP. Elements from this queue are dequeued from the top by a SAP when performing the operation for that SCB. If an operation needs to be retried by the SAP, the SCB may remain the timing queue to retain the timing queues order and will be placed on a high priority instruction queue for retrying the operation. Upon completion of the operation or occurrence of a timeout, the SCB is dequeued. The SCB may be requeued if it was dequeued upon occurrence of a timeout. One or more timing queues may be checked for SCB operation timeouts by one or more SAPs in a round robin fashion.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
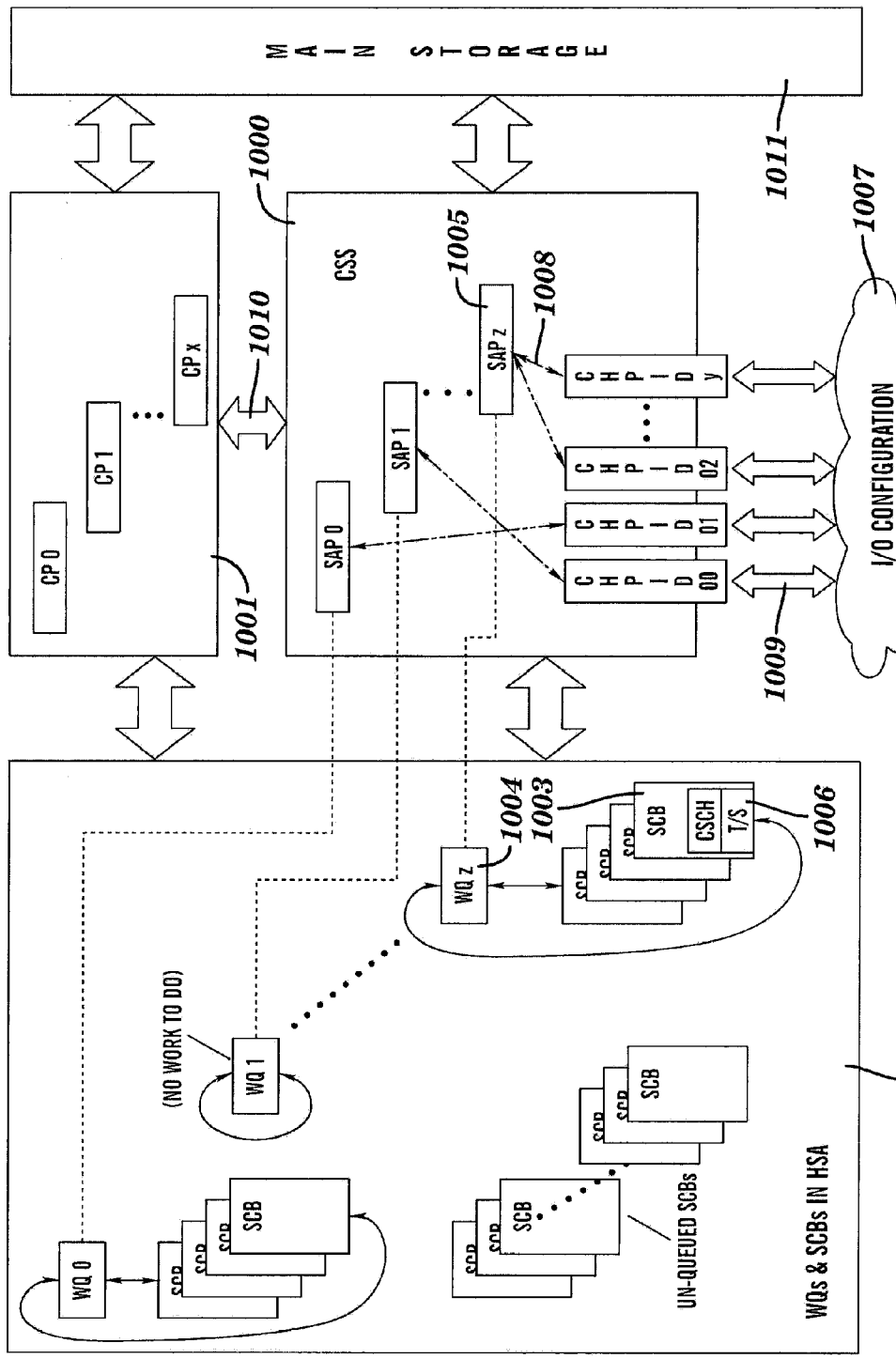
FIG. 1 illustrates a conventional zSeries system.
Figure 2:
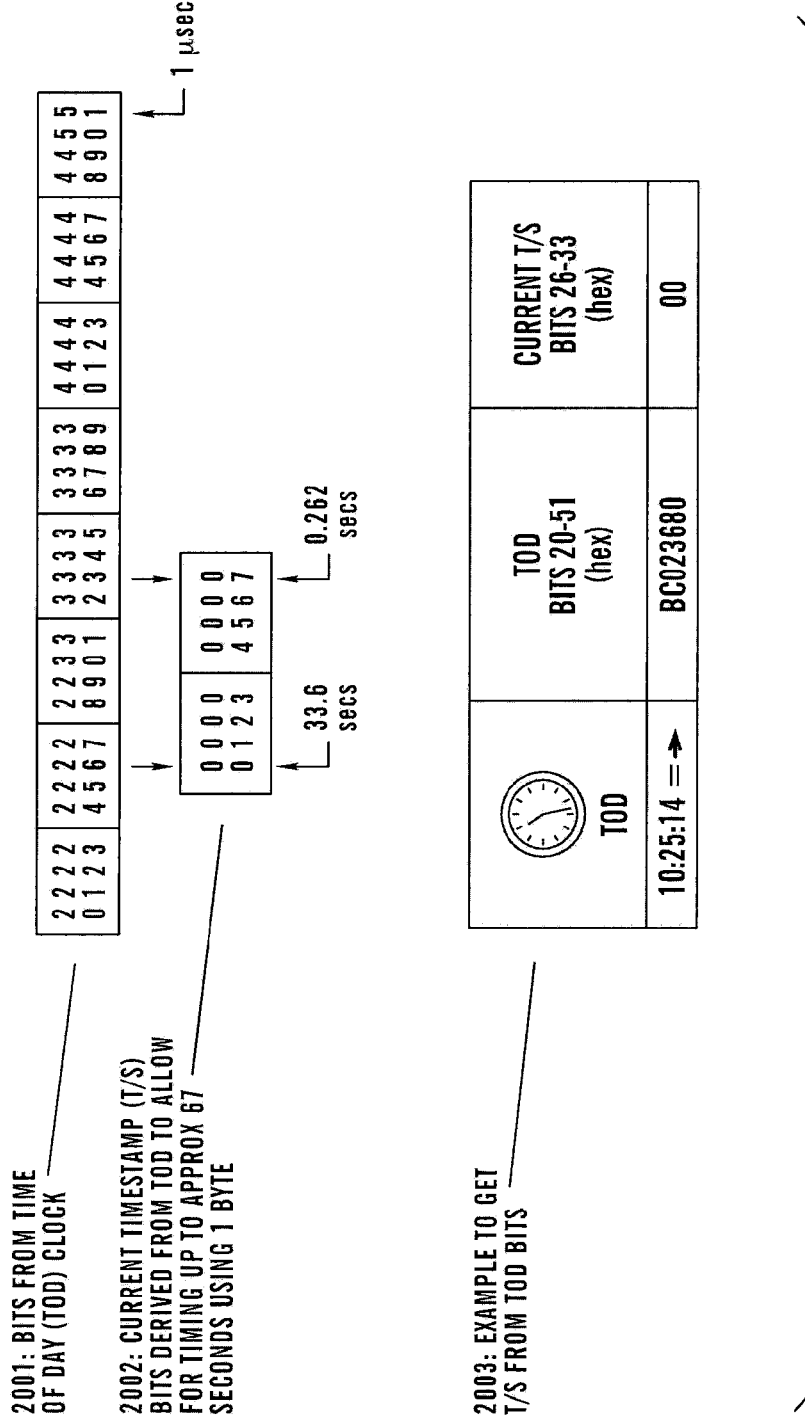
FIG. 2 illustrates how a time stamp may derived from a time of day.
Figure 3:
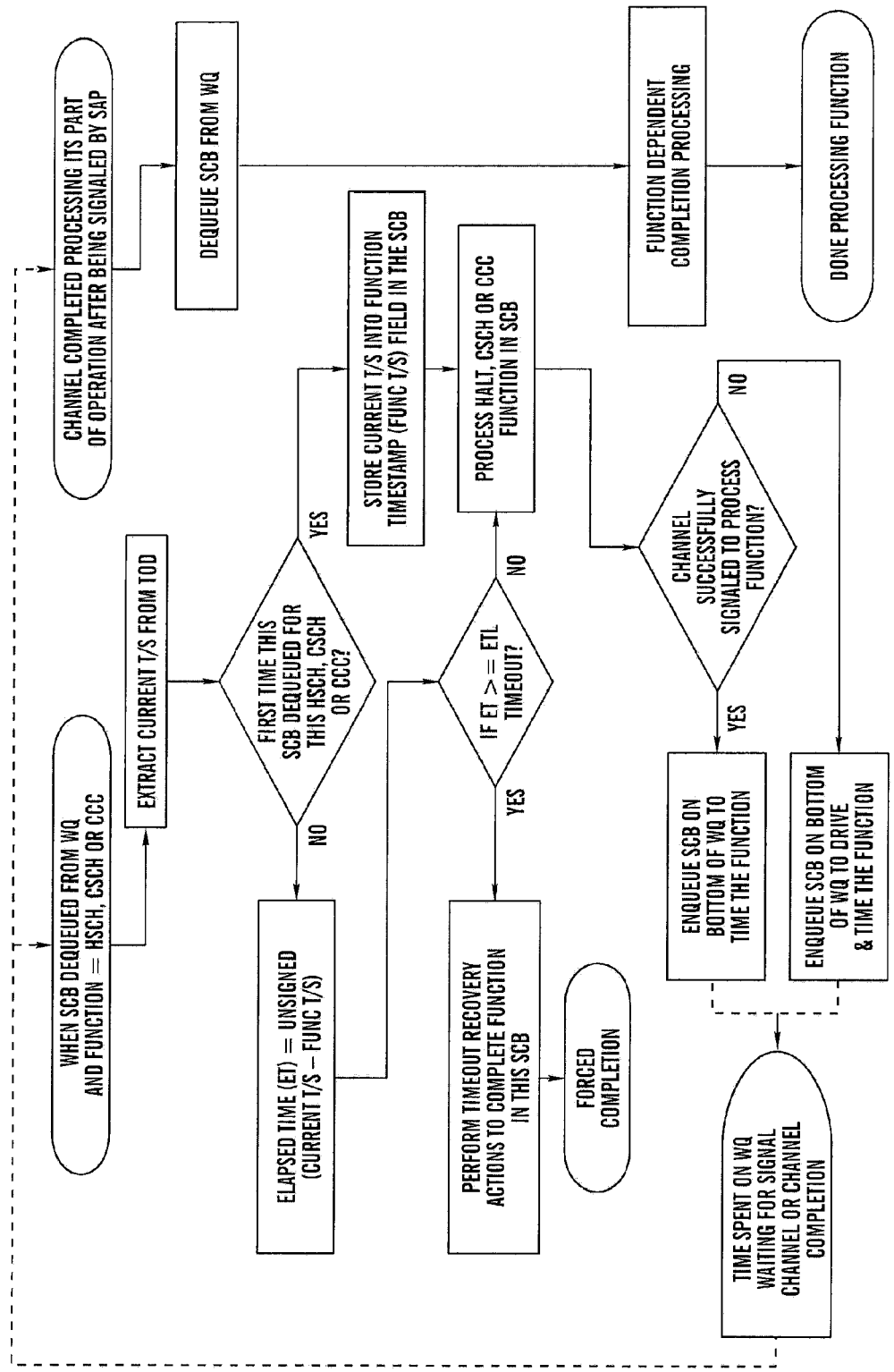
FIG. 3 illustrates a conventional process for timing a HSCH, CSCH, or CCC operation.

The detailed description explains the exemplary embodiments of the invention, together with advantages and features, by way of example with reference to the drawings.

DETAILED DESCRIPTION

According to an exemplary embodiment, methods, systems, and computer program products are provided to significantly reduce the overhead associated with timing subchannel related I/O operations of various durations as well as reduce the necessity to scan for subchannels having HSCH, CSCH and CCC operations to process. This is accomplished by having a separate timing queue (TQ) for each of the durations or elapsed timeout limits (ETL) being timed that any SAP can use to time I/O operations. The SCBs or elements on a particular TQ are ordered from "oldest" to "youngest" starting from the top of the queue. For example, for I/O operations that need to be timed for 14 seconds (e.g., HSCH and CSCH operations), there may be a TQ that only contains elements being timed for 14 seconds. For I/O operations that need to be timed for 7 seconds (e.g., CCC operations), a different TQ may set up. Maintaining order from "oldest" to "youngest" elements in each timing queue is accomplished by queuing an element on the bottom of a TQ with a function timestamp taken at the point in time that it needs to be timed from. This ensures that the elements preceding this element are "older" (or the "same age", depending on timer resolution) and hence time out sooner than the element just queued on the same TQ. This order, coupled with the fact that all elements on this particular TQ are being timed for the same duration (e.g., 14 seconds or 7 seconds) ensures that if an "older" element toward the top of the queue does not time out, the elements that are "younger" do not time out.

To preserve the order of "oldest" to "youngest" for cases when an element already on the TQ needs to be re-timed from the beginning, that element may be dequeued from the TQ even if it is in the middle of the queue, and it may be then requeued on the bottom of the appropriate TQ with a new function timestamp taken at the time of the queue. This situation can arise, e.g., if a CSCH instruction is initiated for an SCB that is already being processed for a HSCH instruction.

A big advantage to this age ordered, fixed duration timing queue structure is that when checking for timeouts, if a SAPs TQ checking process (TQCHK) finds that the top of the queue element (the "oldest" element) does not time out, the SAP does not need to check any other elements on that TQ, no matter the number of elements being timed on that TQ. This is potentially a huge overhead savings.

Another advantage is that when checking for a timeout, there is no need to dequeue any elements unless a timeout is detected or the operation being timed either completes or no longer needs to be timed. In the case of a timeout being detected in the "oldest" element, the TQCHK process dequeues that element from the top of the queue and initiates any necessary recovery for that element and the associated I/O operation. The new topmost element is then the "oldest", and the TQCHK process is repeated until the new "oldest" element is not in a timeout state.

According to an exemplary embodiment, a separate HSCH/CSCH/CCC instruction queue (HCCQ) may be provided for each SAP to further streamline processing these instructions without requiring that the queues be scanned as was done in conventional timing methods. An advantage here is that with only these high priority operations on the queue, scanning by the SAPs is not needed since there is no need to skip around subchannels with lower priority SSCH operations. Now, when the "Halt/Clear signal" is received by the SAP, the SAP only needs to dequeue the first element off the instruction queue to get one of the high priority operations to process. Another advantage to the new HCCQ is that the WQs are freed up to contain only SCBs with performance sensitive Start Subchannel (SSCH) I/O operations.

According to exemplary embodiment, SCBs may be queued on both a TQ and HCCQ for cases when initiative to drive a HSCH, CSCH or CCC function needs to be maintained, but the operation needs to be timed as well. An example of when this can occur is if the SAP attempts to issue a HSCH instruction to a channel, and the channel is busy. In this case, the SAP puts the SCB with the HSCH instruction back on the bottom of the HCCQ. However, the SAP must begin timing the HSCH operation when it first gets the HSCH instruction for an SCB because should the channel be in some error state whereby it always appears busy, the SAP needs to time the HSCH instruction by putting the SCB on a TQ as well.

According to one embodiment, the checking of the TQs among all the SAPs may be performed on a "round robin" basis to ensure that not all the SAPs are competing unnecessarily to check the timing queues. This avoids wasting SAP utilization. This also allows for dynamic rebalancing of the checking of the TQs among the functional SAPs, as SAPs are added or removed from the configuration as the machine is running. Another advantage here is that any SAP can be used to run a TQCHK process, regardless of which SAP put the SCB on a TQ.

Figure 5:
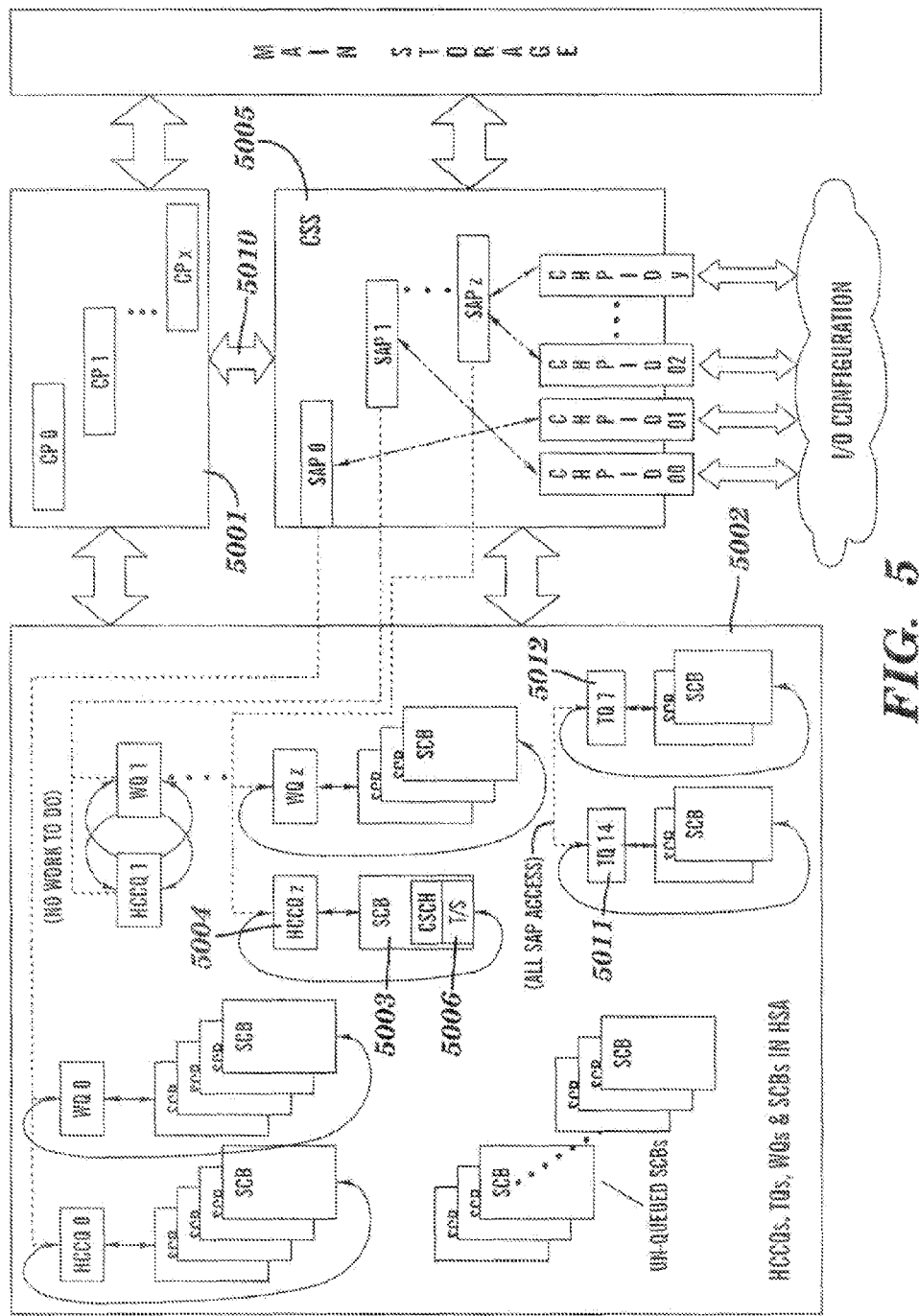
FIG. 5 illustrates a zSeries system according to an exemplary embodiment.

FIG. 5 illustrates a zSeries mainframe according to an exemplary embodiment. In this embodiment, TQs are added to the HSA for timing operations of different durations. HCCQs are added not only for improved performance in handling HSCH, CSCH and CCC processing, but as a method to give initiative to a SAP to retry parts of an operation, if need be, while continuing to time the operation for the same ETL without dequeuing the SCB from that timing queue. When the SAP needs to retry part an operation as it will do when it encounters a channel busy condition, it will put the SCB on the bottom of the HCCQ to allow the channel a chance to become non-busy. The SAP will retry that operation after that SCB bubbles up to the top of the HCCQ and is dequeued. In the system shown in FIG. 5, HSCH/CSCH/CCC Queues (HCCQ) and Timing Queues (TQ) have been added in HSA 5002. In the system shown in FIG. 5, there is one HCCQ per SAP and one TQ per ETL for operations being timed for the same duration. In the example shown in FIG. 5, there is a TQ 5011 for a fourteen second ETL and a TQ 5012 for a seven second ETL needed to time a CSCH or HSCH for fourteen seconds and CCC operations for seven seconds. Had there been a need to time the HSCH or CSCH for a different duration other than the seven or fourteen second ETL, this embodiment could be extended to include in HSA additional TQs, one per each additional ETL. For example, if a CSCH needed to be timed for sixteen seconds whereas an HSCH needed to be timed for fourteen seconds, an additional TQ with a sixteen second ETL could be added.

If a software program running on a CP 5001 initiates a CSCH instruction to an SCB in HSA 5002, the CP firmware executing the CSCH as part of normal processing of this instruction first sets the CSCH function 5006 into an SCB 5003 and then proceeds to queue that SCB on the bottom of instruction queue HCCQ z 5004. The CP firmware then signals SAP z 5005, the owner of HCCQ z, with a "Halt/Clear signal" via control circuitry 5010. This signal indicates that one or more SCBs with this function to process has been queued on HCCQ z. SAP z then dequeues the first element off the top of HCCQ z rather than searching the queue, as was done conventionally. Had the SCB 5003 been on WQ z with a SSCH prior to the program issuing the CSCH instruction, the CP firmware would have first dequeued the SCB off WQ z before queuing it to the bottom of HCCQ z. This small additional overhead to first dequeue the SCB off the WQ pales in comparison to having to scan the WQ as was done conventionally.

Figure 6:
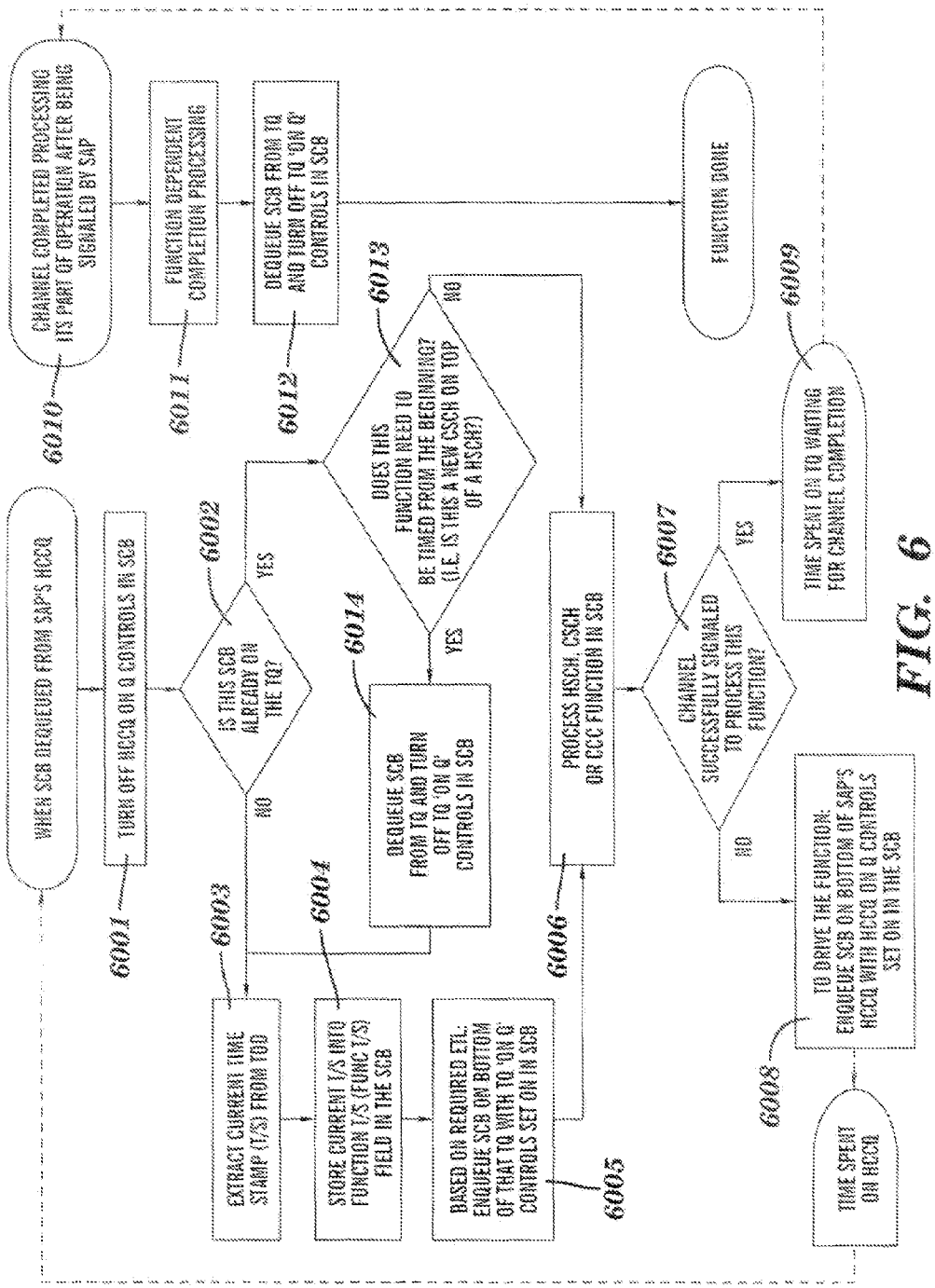
FIG. 6 illustrates a method for processing a HSCH, CSCH or CCC operation with timing queues according to an exemplary embodiment.

The functional processing flow and how the TQ is used to time operations are shown in FIG. 6. For illustrative purposes, processing and timing of a CHSC operation are described below. It should be appreciated, however, that similar processes may be used for processing and timing other I/O operations, such as HSCH and CCC operations.

Referring to FIG. 6, once SAP z dequeues the SCB 5003 from HCCQ z, the processing flow for this function begins at step 6001. As part of the dequeue process, the HCCQ bit in the SCB is turned off to indicate that the SCB is no longer on a HCCQ at step 6001. If this is the first time this particular SCB has been dequeued off the HCCQ for this particular CHSC, this SCB will not already be on the TQ. Hence, after determining that this SCB is not already on the TQ at step 6002, the function time stamp (FUNC T/S) is set into the SCB by performing steps 6003 and 6004. This SCB is then queued at the bottom of a TQ that has an ETL for the maximum amount of time this operation can take at step 6005. For example, the SCB may be queued on TQ fourteen, since a CSCH function needs to be timed for approximately fourteen seconds.

The actual processing of the function is handled at step 6006. The actual CSCH functional processing is only described in general terms as it relates to timing this function. The mechanisms for timing the CSCH can be applied to other functions that require timing, e.g., HSCH and CCC functions. As part of function processing, a function might need to signal another element to perform part of the overall function. For example, the CSCH function may need to signal the channel to perform the selective reset to the device indicated by the SCB. In this embodiment, the SAP attempts to signal the channel that it must perform its portion of CSCH processing. A determination is made at step 6007 whether the channel is successfully signaled to process the function. If the channel is successfully signaled, the SCB stays on the TQ waiting for channel completion at block 6009. While this SCB is on the timing queue, the SAP can perform other work. In essence, the CSCH process goes to "sleep" until either the channel responds to SAP z that is has completed the CSCH operation or a timeout is detected in the Timing Queue Checking (TQCHK) process, as described later. If the channel completes the operation, the channel signals the SAP that had signaled the channel, and the SAP resumes processing at step 6010, performs some additional function specific processing at step 6011 and dequeues the SCB off the TQ at step 6012. At this point, the CSCH operation is completed.

If at step 6007 it is determined that the channel is not successfully signaled, e.g., because some form of busy condition is encountered that requires that the CSCH operation be suspended for a period of time and then be retried at some later time, initiative to re-attempt signaling the channel is maintained by queuing the SCB on the bottom of the HCCQ for this SAP at step 6008. Thus, at this point, this SCB is queued on both the HCCQ for SAP z at 6008 and on the TQ 14 (queued previously at step 6005) to time the overall CSCH operation. At some point later in time, this SCB will eventually bubble up to the top of this HCCQ after the SAP processes other SCBs already on this queue, and the processing of this CSCH will take back up at step 6001. However, this time the SCB is already on TQ 14, so processing at step 6013 occurs. At step 6013, a determination is made whether the CSCH function needs to be timed from the beginning, e.g., by determining if this is a new CSCH on top of a HSCH. Since, in this example, a CSCH was not issued on top of a HSCH, the function does not need to be timed from the beginning, so processing at 6006 occurs. If the processing at step 6006 attempts to re-signal the channel to process the CSCH operation and the attempt to re-signal also fails, processing at step 6008 may again be taken. In either case, whether the channel is or is not signaled at step 6007, the SCB will still be on the TQ to ensure the operation completed in the fourteen seconds. This will be described with reference to FIG. 7.

With regard to a CSCH instruction initiated while a HSCH instruction for the same SCB is being processed, the timing for a particular SCB may be reset while still maintaining the ordered timing queue. If a determination is made at step 6013 that a CSCH instruction was issued on top of a HSCH instruction by a program running on a CP, the timing for the CSCH operation needs to be started over again. Had there been a HSCH operation already in progress for this SCB, it would have been on the TQ already. In this case, the processing flows to step 6014. Since, in this case, the CSCH operation needs to be timed for, e.g., a fourteen second period, the SCB with the HSCH operation in progress needs to be dequeued from the TQ at step 6014. Then, processing occurs at steps 6003 and 6004, and a new Current T/S is set into the Function T/S field in the SCB before the SCB is queued at the bottom of TQ 14 at step 6005. Processing this CSCH function continues at step 6006, and the previously described processes occur. Queuing an SCB at the bottom of a TQ with the FUNC T/S set to the Current T/S preserves the desired queuing order of oldest at the top to youngest at the bottom on an Ordered Timing Queue.

Figure 7:
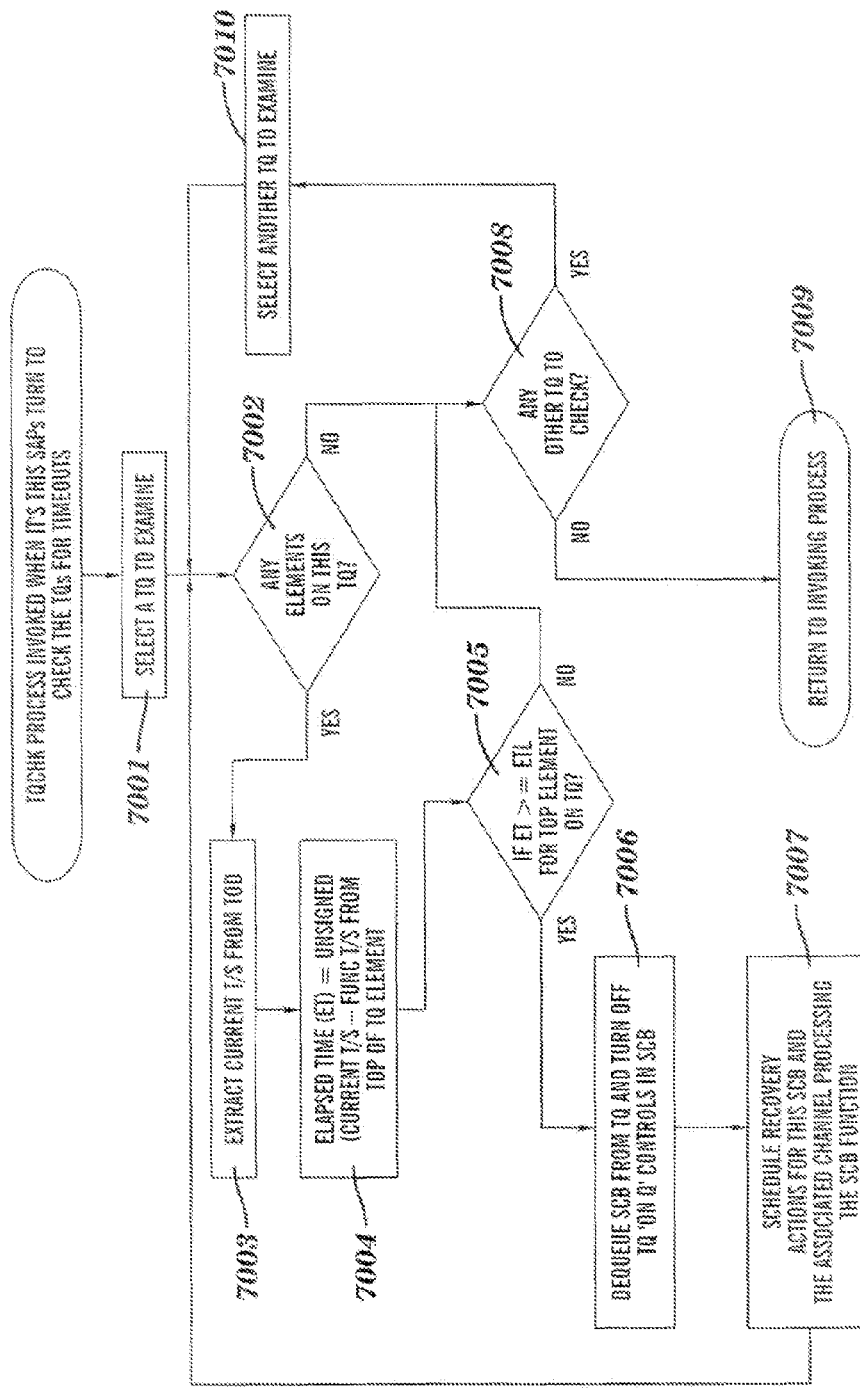
FIG. 7 illustrates a process for timing queue checking according to an exemplary embodiment.

FIG. 7 illustrates timing queue checking (TQCHK) processing that occurs when a TQCHK instruction is dispatched to run on a SAP according to an exemplary embodiment. When the TQCHK is dispatched at an SAP, a TQ is selected to be examined at step 7001. As described above, the TQs may be checked by multiple SAPs on a "round robin" basis. If at least one element is determined to be on the TQ at step 7002, processing occurs at steps 7003 and 7004. Here, the elapsed time (ET) is computed for the SCB at the top of the TQ by subtracting the Function Time Stamp (FUNC T/S), which is set into the SCB as illustrated in FIG. 6, from the Current T/S taken, e.g., from the time of day clock. At step 7005, a determination is made whether a timeout has occurred for the SCB at the top of this TQ by comparing the ET against the Elapsed Timeout Limit (ETL) and determining if ET is greater than or equal to the ETL for the top element on the TQ. This comparison of the ET and the ETL may be done without having to dequeue this SCB from the TQ. If there is no timeout for this SCB, i.e., the ET is not greater than or equal to the ETL for the top element on the TQ, there is no need to drill down further in this TQ since the oldest element is on the top of the TQ. If there is a timeout, and the ET is thus greater than the ETL for the top element on the TQ, processing occurs at step 7006 whereby the SCB is dequeued off the TQ being processed, e.g., TQ 14 or TQ 7, as determined from the On Queue controls in the SCB. At step 7007, function specific recovery actions are scheduled which may involve putting other elements in the system, such as the channel or SAP involved in the function that timed out, through recovery. Recovery will dequeue the SCB from any queue that it may be on, change the function controls in the SCB for it to be Channel Control Checked (CCC) and queue the SCB on the bottom of the HCCQ. Since CCCs are timed as well, the method for timing the CCC will resume in FIG. 6 at step 6001. Except in this case, the CCC function only needs to be timed for, e.g., seven seconds. Hence, the SCB is queued on TQ 7. The subsequent CCC processing causes the CSCH operation to complete. Those skilled in the art will understand the details of this recovery process, the description of which is omitted here for the sake of brevity. While a recovery process is described above, it should also be noted that in other embodiments, application specific processes other than recovery could be dispatched when a timeout condition is detected. The timing mechanism according to exemplary embodiments may be used to determine whether or not a timeout has occurred for an operation (such as HSCH, CSCH, CCC or any other function in another embodiment.). Whether the timeout is due to a persistent channel busy condition or some other reason, if a timeout is detected, any suitable process, such as a recovery action, may be dispatched to clean up and complete the operation.

After the recovery process at step 7007 schedules the recovery for this SCB, this same TQ may be checked for additional elements to see if additional SCBs timed out. If at step 7002 it is determined that there are additional elements on the TQ, steps 7003 and 7004 are taken, and the new SCB on top of the TQ is examined for a timeout at step 7005. If there is no time out for this new SCB on top of the TQ, a check is then made to see if there are any other TQs in the system to check at step 7008. In this example, TQ 14 was being processed, so now TQ 7 would be next, and the TQCHK process continues at step 7010. Once the TQCHK process for TQ 7 is completed and there are no other TQs to check, the invoking process is returned to at step 7009. According to an exemplary embodiment, the process that invokes TQCHK is illustrated in FIGS. 8a and 8b.

Figure 8A:
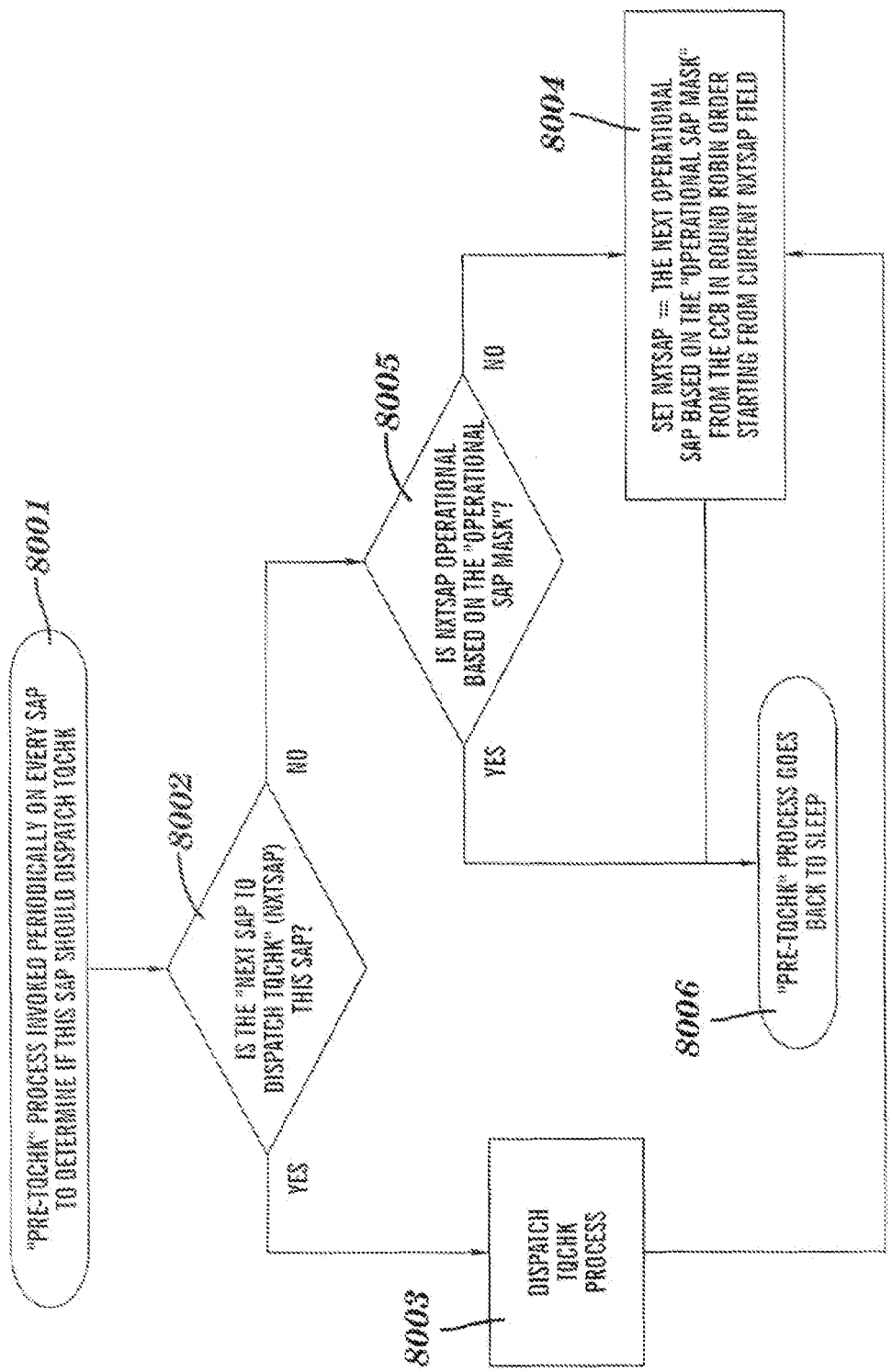
FIG. 8a illustrates a process for dispatching timing queue checking according to an exemplary embodiment.
Figure 8B:
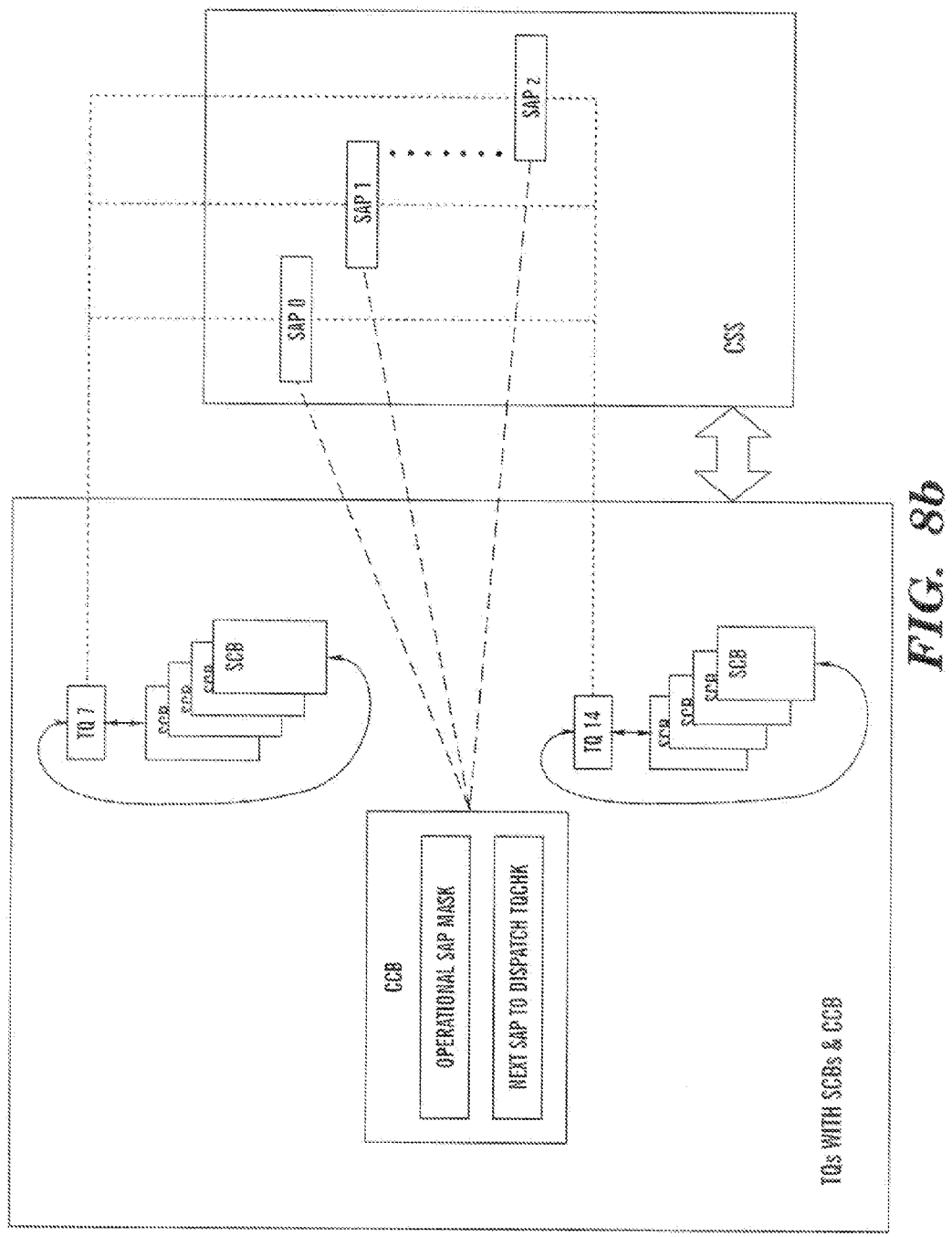
FIG. 8b illustrates a process for time queue checking by multiple SAPs in a round robin fashion according to an exemplary embodiment.

FIG. 8a illustrates how the TQCHK process is dispatched among one or more SAPs according to an exemplary embodiment. At step 8001, the "pre-TQCHK" process may be invoked at periodic intervals on all SAPs in the system. The rate of dispatch may depend on the rate of timeouts. If too small an interval is chosen, then unnecessary overhead may be incurred among all the SAPs. Conversely, if too large an interval is chosen, the TQCHK process may not accurately detect timeouts. Once invoked, pre-TQCHK compares the "Next SAP to Dispatch TQCHK" (NXTSCAP) field to a particular SAP's own SAP identifier to see if it that SAP's turn to dispatch TQCHK at step 8002. In one embodiment, the TQCHK may be stored in a common control block (CCB) accessible to all SAPs. FIG. 8b illustrates multiple SAPs having access to multiple TQs using fields in the CCB as an interlock.

If it is determined at step 8002 that it is that particular SAP's turn, the TQCHK process is dispatched at step 8003. After completing the TQCHK process, processing at step 8004 occurs to set NXTSAP (Next Operational SAP). NXTSAP may be set to the value of the next operational SAP in round robin order based on the "Operational SAP Mask", from the CCB starting from the current NXTSAP field. The pre-TQCHK processing is then completed at step 8006.

If at step 8002 it is determined that it is not that particular SAP's turn to dispatch the TQCHK process, a determination is made at step 8005 to test whether the SAP indicated in the NXTSAP field is operational based, e.g., on the Operational SAP Mask. If it is operational, processing at step 8006 occurs. If not, processing at step 8004 occurs to set NXTSAP to an operational SAP. The need for continually ensuring that the NXTSAP is operational is important in a system whereby the processors dispatching the TQCHK process can be added and removed while the system is running. This ensures reliable dispatching of the TQCHK process in a dynamic add and remove SAP environment. It should be appreciated that for the remove case, the processors being removed would likely need to be idle. One skilled in the art would understand the method of ensuring that a processor is idle before being removed from operation, the details of which are omitted here for the sake of brevity.

Figure 4:
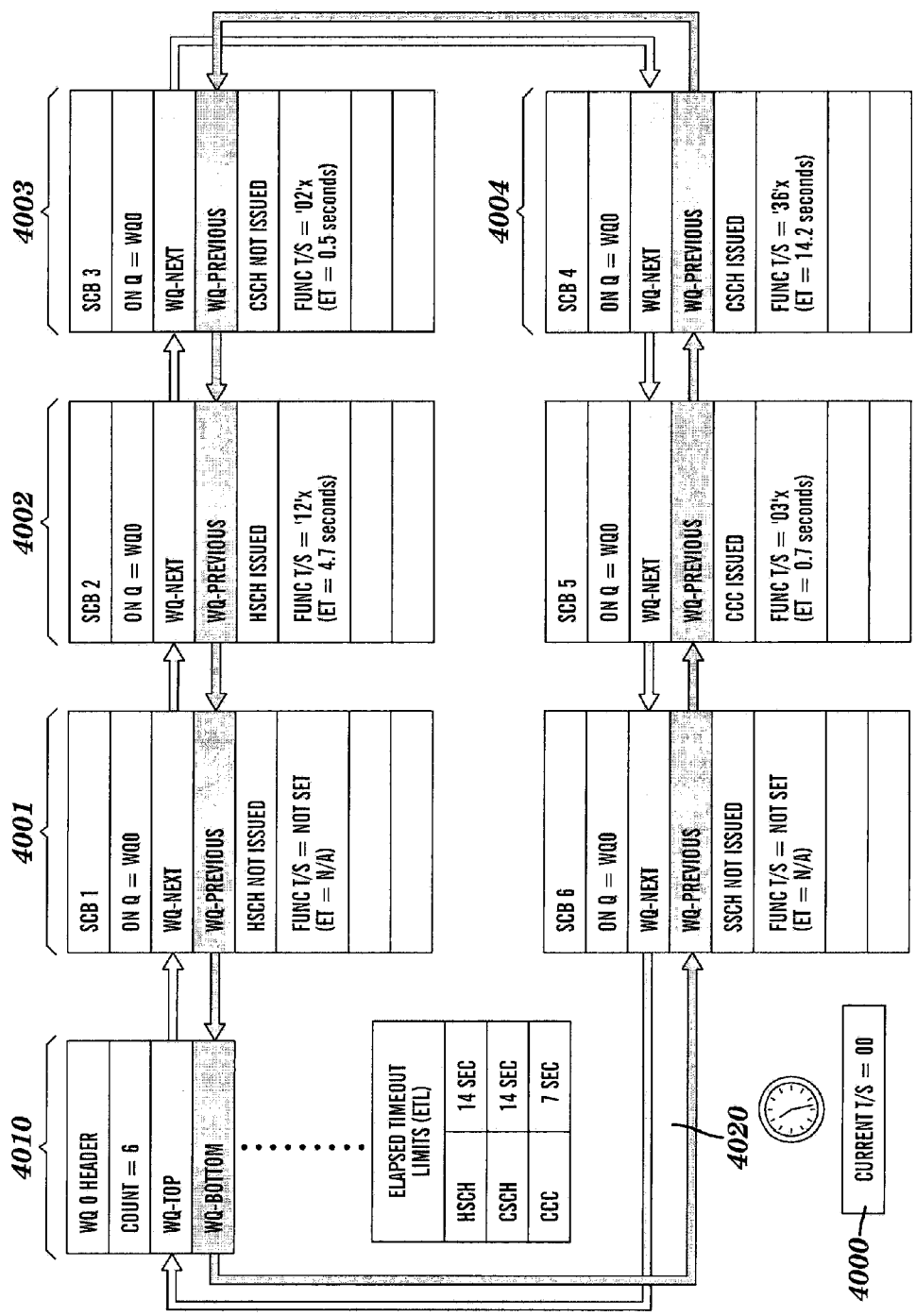
FIG. 4 illustrates states of work queues and timing of subchannels in a conventional zSeries system.
Figure 9:
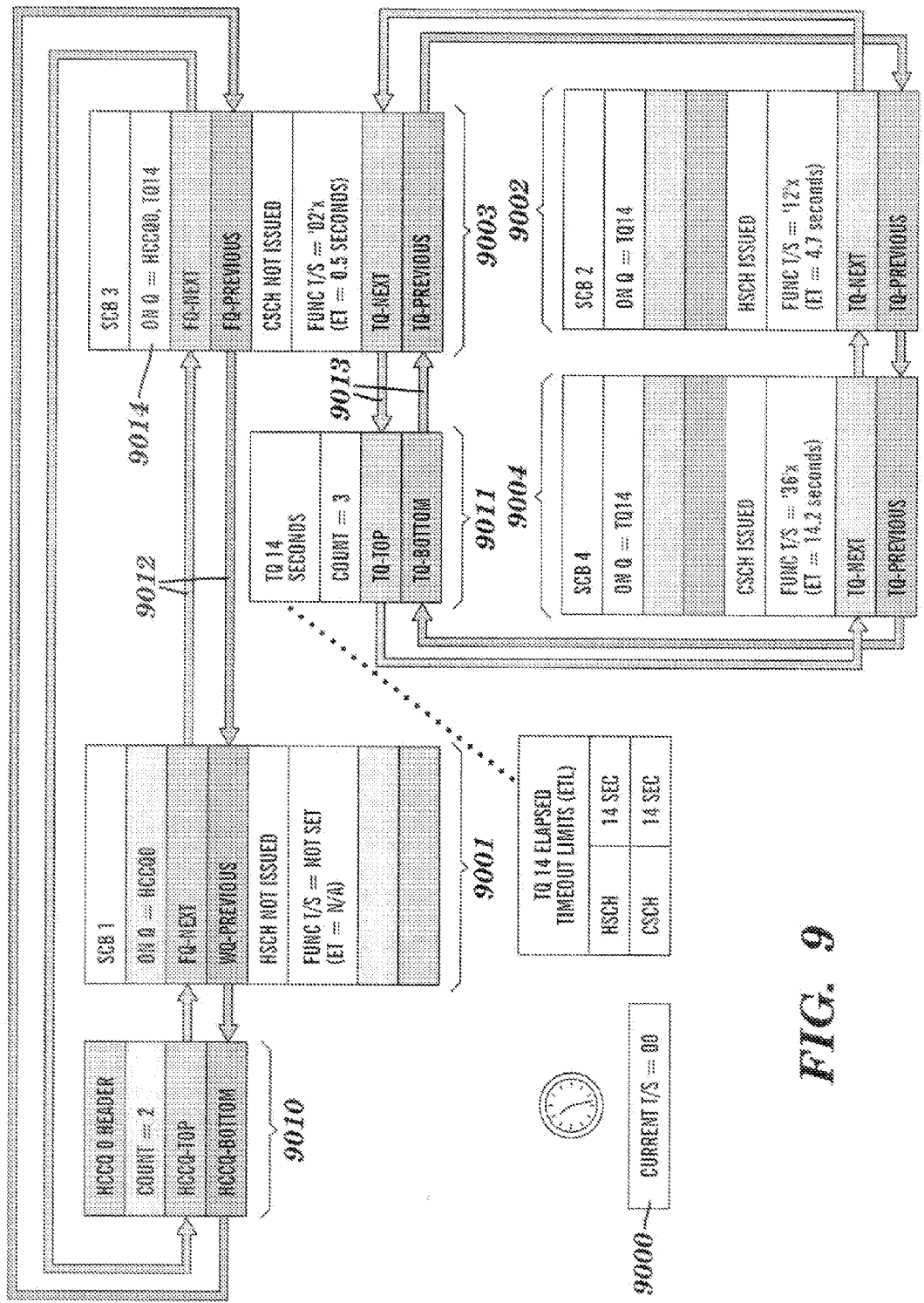
FIG. 9 illustrates states of timing queues, instruction queues and timing of subchannels according to an exemplary embodiment.
Figure 10:
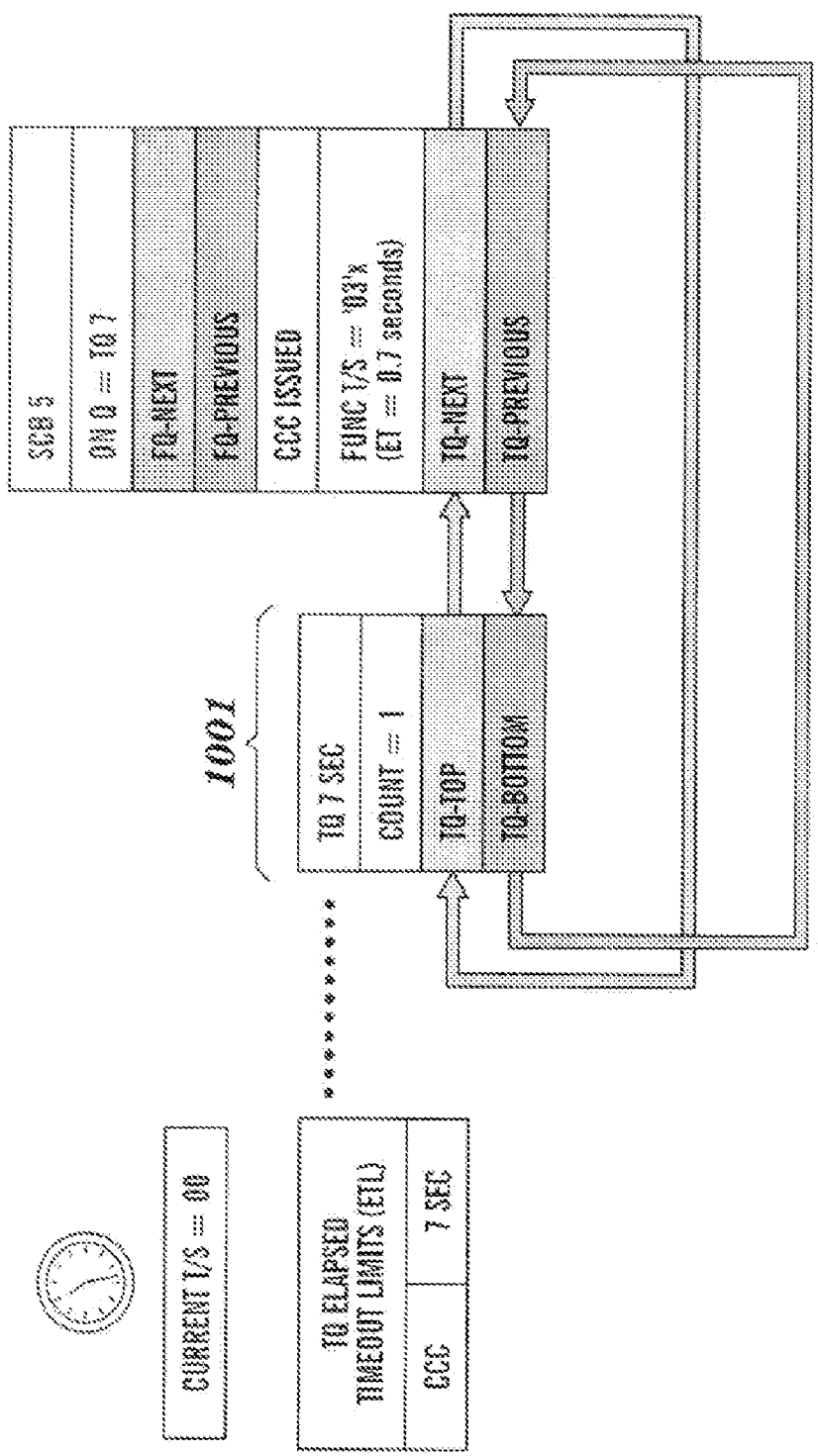
FIG. 10 illustrates how a timing queue be used to time operations according to an exemplary embodiment.
Figure 11:
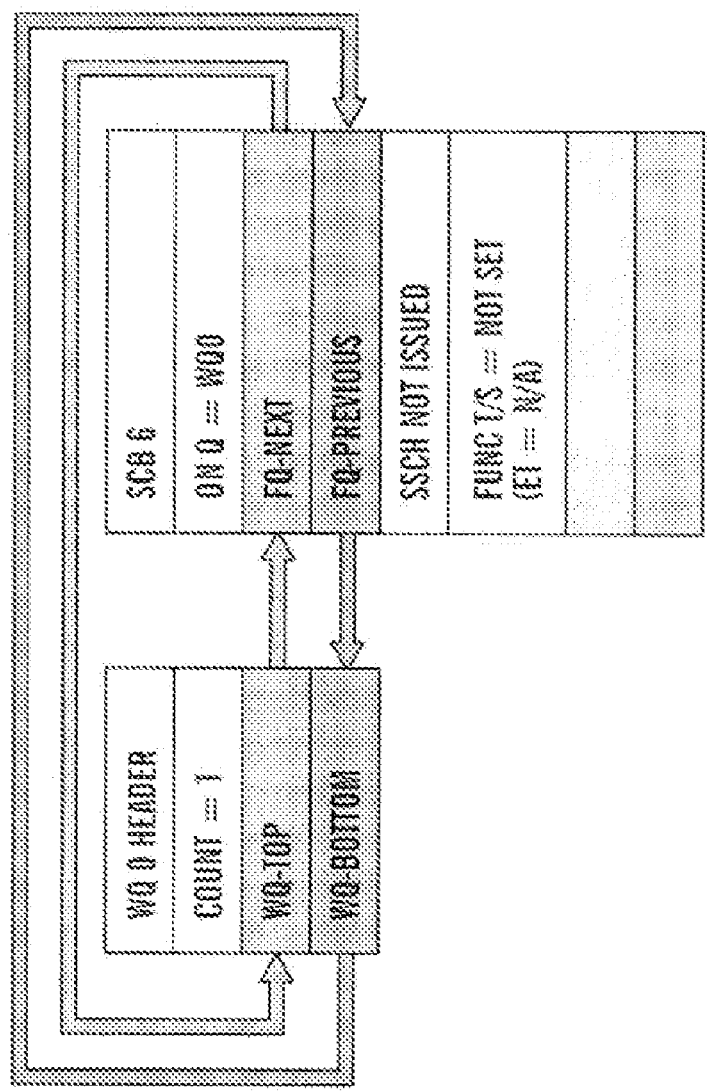
FIG. 11 illustrates a state of a work queue without having to time subchannel operations according to an exemplary embodiment.

FIGS. 9, 10, and 11 show how the example described above with reference to FIG. 4 can be handled according to exemplary embodiments. FIG. 9 illustrates how an instruction queue, HCCQ 9010, and a fourteen second TQ 9011, both with doubly linked lists (DLL), may be populated with SCBs with the same HSCH, CSCH and CCC functions to perform as shown in FIG. 4. According to an exemplary embodiment, each SCB ET that is shown depicts what the ET may be computed to be using the algorithm in FIG. 7 (step 7004) (which in turn uses the illustrated Current T/S shown at 9000 and the same FIG. 4 arbitrary FUNC T/S set into each SCB). In this example, SCB 1 is in the HSCH Not Issued state as indicated at 9001, which means the SAP has not yet signaled a CHPID to perform the HSCH. SCB 1 was put on HCCQ 0 at 9010 for the first time for this HSCH and is shown to have no FUNC T/S value set at 9001. The FUNC T/S will be set into the SCB when the SAP dequeues the SCB off the HCCQ the first time for this HSCH function, as previously illustrated in FIG. 6.

It is also possible that in other embodiments, the CP firmware could set the FUNC T/S into the SCB when the CP queues the SCB on the HCCQ rather than having the SAP set the FUNC T/S into the SCB when the SAP dequeues the SCB from the HCCQ. This could be done to improve timeout accuracy.

SCB 2 is in the HSCH Issued state at 9002 which means the HSCH has been issued to a channel. Note that, according to exemplary embodiments, this SCB is on TQ 14 at 9011 rather than on the WQ to be timed. This reduces contention for and the length of the WQ. When completion of the HSCH operation occurs and the channel responds back to the SAP that the HSCH is completed, the SAP removes the SCB from this TQ. In the meantime, while it is being timed, there is no need to dequeue it from the TQ based on the algorithm illustrated in FIG. 7.

SCB 3 is in the CSCH Not Issued state at 9003. With FUNC T/S set, an attempt was made to issue the CSCH on a channel. In this case, HCCQ 0 at 9010 is being used to provide initiative for the SAP to keep attempting to issue the CSCH to a channel. Most likely, the selected channel was busy and the SCB had to be re-queued on the HCCQ to try to signal the channel to process the CSCH instruction. While it is being re-tried, this SCB is also on TQ 14 at 9011 to time the overall CSCH operation.

Note that there are two sets of DLL chain pointers in the SCB to be able to have the SCB on 2 queues at the same time when needed: FQ-Next and Previous at 9012 to be used for either the HCCQ or WQ and the TQ-Next and Previous at 9013 to be used only for the TQ if necessary.

In addition, note that at 9014 multiple 'On Q' controls are set in the SCB: HCCQ0 and TQ 14 to indicate which queues this SCB is on. According to an exemplary embodiment, there may be a "HCCQ ON Q" bit, a "WQ On Q" bit, and a "TQ On Q" bit along with additional fields indicating the "WQ-HCCQ Number" and the "TQ Number". The WQ-HCCQ Number is a combined field since the SCB need only be on either a WQ or a HCCQ, but not both. In this example, the SCB is on HCCQ 0 and TQ 14. Thus, in the actual SCB, the HCCQ On Q bit will be ON along with the WQ-HCCQ Number set to 0, and the TQ On Q bit will be ON along with the TQ Number set to 14. In other embodiments, there may be a need to have multiple timing queues with the same duration. In that case, the application that enqueues and dequeues an element from timing queue would need to have a way to discern which queue of the same duration would be used. One method is to use a different encoding scheme for the "TQ number" that could reflect this. For example, if there were two 14 second queues, a "TQ number of 141 could identify the $1^{st}$ 14 second TQ and a "TQ Number" of 142 could identify the $2^{nd}$ 14 second TQ. In any case, the application would need to have knowledge of this encoding scheme whether or not multiple timing queues with the same duration was supported.

SCB 4 is in a CSCH Issued state at 9004 which means the CSCH has been issued to a channel. Like HSCH Issued for SCB 2, this SCB is on TQ 14 at 9011 to time for completion of the CSCH. However, in this case, the ET of 14.2 seconds at 9004 has exceeded the ETL timeout value. According to an exemplary embodiment, since the ET is over the 14 second ETL for this operation, when the TQCHK process is dispatched as illustrated in FIGS. 7 and 8a, the SAP performing the TQCHK process then takes the appropriate actions to recover the CSCH operation, forcing it to complete.

FIG. 10 illustrates how a TQ may be used to time CCC operations. In the example shown in FIG. 10, SCB 5 is in a CCC Issued state. Like the HSCH Issued and CSCH Issued states, the SCB is on a TQ as a means to time the CCC. However, for CCC functions, the ETL timeout is different than the ETL timeout for the HSCH or CSCH functions. For example, the ETL may be 7 seconds for the CCC function. Thus, this SCB is on the 7 second timing queue, TQ 7, at 10001.

FIG. 11 illustrates a state of a work queue and timing of a subchannel according to an exemplary embodiment. In FIG. 11, SCB 6 is in a SSCH Not Issued state. The SCB 6 in FIG. 11 is in the same state at the SCB 6 depicted in FIG. 4, and, as before, SSCH instructions do not need to be timed. However, what is striking about this example is that only SCBs with Start Subchannels to execute are on the WQ in FIG. 11. Thus, a reduction in the number of SCBs on WQ 0 has been achieved. In this example, the number of SCBs on the WQ has been reduced from six SCBs in FIG. 4 down to one SCB in FIG. 11. This demonstrates the great reduction in WQ bottlenecking that is achieved by the timing technique according to exemplary embodiments.

While the description above has focused on operations of seven second and fourteen second durations, it should be appreciated that operations of any duration may be timed with timing queues dedicated to the ETL for each operation. Moreover, there may be more than one timing queue for operations of the same duration as described above. In other embodiments, it may be necessary to time an operation of the same type for a different duration based on the application. This too is possible and can be accomplished with the method described above with reference to FIG. 6. At step 6005, the application could consider other application dependent states when making the decision as to which TQ it would need to enqueue the SCB and the setting the SCB 'On Q' controls rather than making the decision solely on the type of operation.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for timing operations in a multi-processor, multi-control block environment, the method comprising the steps of: receiving a request for a subchannel control block (SCB) to perform an operation;
queuing the SCB in one of multiple of timing queues based on an elapsed timeout limit (ETL) of the operation, wherein each operation has associated ETL, and each one of the multiple timing queues has associated ETL for completing an operation;
determining, without dequeuing the SCB, occurrence of a timeout by computing an elapsed time (ET) and determining that the elapse time is greater then or equal to the ETL, dequeuing the SCB upon the occurrence of the timeout; and
upon completion of the operation, dequeuing the SCB.

2. The method of claim 1, wherein the step of queuing includes placing the SCB at the bottom of a timing queue that is ordered from oldest to youngest.

3. The method of claim 1, further comprising, upon receipt of a request to perform a high-priority operation, queuing the SCB in a high priority instruction queue.

4. The method of claim 1, further comprising, requeuing the SCB if the timing was halted upon occurrence of a timeout.

5. The method of claim 1, further comprising, if it is determined that there is no timeout for the top element in the multiple timing queues, not drilling down further in the multiple timing queues.

6. The method of claim 1, wherein the timing queues are checked for an SCB operation to perform.

7. The method of claim 6, wherein the timing queues are checked in a round-robin fashion.

8. A system for timing operations of different durations, comprising:
a plurality of subchannel control blocks (SCBs) for receiving instructions for performing specific operations;
timing queues for queuing different one of said SCBs, wherein each timing queue is associated with each of said SCBs operation having a fixed elapsed time limit, and upon receiving a request to perform an operation, each subchannel control block (SCB) is queued in one of said timing queues corresponding to a predetermined fixed elapsed time limit for the operation;
determining, without dequeuing the SCB operation, occurrence of a timeout by computing an elapsed time (ET) and determining that the elapse time is greater then or equal to the fixed elapsed time limit, dequeuing the SCB operation upon the occurrence of the timeout; and
upon completion of the operation, dequeuing the SCB operation.

9. The system of claim 8, wherein the step of queuing includes queuing the SCB at the bottom of a timing queue ordered from oldest to youngest.

10. The system of claim 8, further comprising a high-priority instruction queue for queuing SCBs upon receipt of an instruction to perform a high-priority operation.

11. The system of claim 8, wherein if a timeout occurs, the SCB is requeued.

12. The system of claim 11, wherein the timeout is determined by computing an elapsed time (ET) and determining that the elapsed time is greater than or equal to the ETL.

13. The system of claim 8, wherein the timing queues are checked for an operation to perform.

14. The system of claim 13, wherein the timing queues are checked in a round-robin fashion.

15. A computer program product comprising a computer readable storage medium, having stored thereon a computer readable program, wherein the computer readable program when executed on a computer causes the computer to:
receive a request for a subchannel control block (SCB) to perform an operation;
queue the SCB in one of multiple of timing queues based on an elapsed timeout limit (ETL) of the operation, wherein each operation has associated ETL, and each one of the multiple timing queues has associated ETL for completing an operation;
determine, without dequeuing the SCB, occurrence of a timeout by computing an elapsed time (ET) and determining that the elapse time is greater then or equal to the ETL, dequeuing the SCB upon the occurrence of the timeout; and
upon completion of the operation, dequeuing the SCB.

16. The computer program product of claim 15, wherein the computer readable medium causes the computer to queue the SCB at the bottom of a timing queue that is ordered from oldest to youngest.

17. The computer program product of claim 15, wherein upon receipt of a request to perform a high-priority operation, the computer readable medium causes the computer to queue the SCB in a high priority instruction queue.

18. The computer program product of claim 15, wherein the computer readable medium further comprises the SCB to be requeued if a timeout has occurred.

19. The computer program product of claim 18, wherein computer readable medium causes the computer to determine the timeout by computing an elapsed time (ET) and determining that the elapsed time is greater than or equal to the ETL.

20. The computer program product of claim 15, wherein computer readable medium causes the computer to check the timing queues an SCB operation to perform.

21. The computer program product of claim 20, wherein the timing queues are checked in a round-robin fashion.

* * * * *